United States Patent [19]

Elmer

[11] 4,116,657
[45] Sep. 26, 1978

[54] PROCESS FOR INCREASING THE ANNEALING POINT OF 96% SILICA GLASS

[75] Inventor: Thomas H. Elmer, Corning, N.Y.

[73] Assignee: Corning Glass Works, Corning, N.Y.

[21] Appl. No.: 794,062

[22] Filed: May 5, 1977

[51] Int. Cl.$^2$ ............... C03C 19/00; C03C 15/00; C03B 25/00

[52] U.S. Cl. ................... 65/23; 65/30 R; 65/32; 65/117; 65/120

[58] Field of Search ............... 65/23, 32, 117, 120, 65/30 R

[56] References Cited

U.S. PATENT DOCUMENTS

| | | | |
|---|---|---|---|
| 772,902 | 10/1904 | Nolan | 65/120 X |
| 2,505,001 | 4/1950 | Nordberg | 65/32 X |
| 2,612,726 | 10/1952 | Nordberg | 65/32 |
| 2,612,727 | 10/1952 | Nordberg | 65/32 |
| 3,775,078 | 11/1973 | Elmer et al. | 65/32 |
| 3,813,232 | 5/1974 | Forker, Jr. et al. | 65/32 X |
| 3,930,821 | 1/1976 | Elmer | 65/32 |

Primary Examiner—S. Leon Bashore
Assistant Examiner—Frank W. Miga
Attorney, Agent, or Firm—Kees van der Sterre; Clinton S. Janes, Jr.; Clarence R. Patty, Jr.

[57] ABSTRACT

A process for producing transparent high-annealing-point 96% silica glass comprising the steps of depositing a carbon film on the pore walls of the glass, heating the glass and film under non-oxidizing conditions, and removing the carbon film by oxidation, is described.

8 Claims, No Drawings

PROCESS FOR INCREASING THE ANNEALING POINT OF 96% SILICA GLASS

BACKGROUND OF THE INVENTION

The present invention relates to the treatment of 96% silica glass and particularly to a process for treating porous 96% silica glass to increase the annealing point thereof.

Glasses of the kind referred to as 96% silica glasses, and methods for manufacturing the same, are described in U.S. Pat. No. 2,106,744 to Hood et al. In accordance with such methods, alkali borosilicate glasses of specified composition are subjected to a phase separation heat treatment to separate the glass into a silica-rich phase and a phase rich in alkali and boron. This latter phase is then removed by leaching to provide a microporous glass body comprising a very high percentage of silica (typically at least about 94% by weight) and minor amounts of residual alkali and boron.

Glass produced by this process is referred to as 96% silica glass without regard to the exact silica content thereof, and may be used either in the porous state or after consolidation to the non-porous state by heating. In porous form, the glass may be used to support catalysts and enzymes, and as a chromatographic medium. Consolidated 96% silica glass is used to provide refractory glass articles such as crucibles and envelopes for arc lamps.

The annealing point of 96% silica glass depends on the composition of the glass, and is reduced by residual alkali and boron in the glass as well as fluxing constituents such as hydroxyl groups and halogen groups. Transparent 96% silica glass having a high annealing point can be provided by subjecting porous 96% silica glass to supplemental treatments such as described in U.S. Pat. Nos. 3,113,008 and 3,113,855 to Elmer. One such treatment comprises reheating and releaching to remove further alkali and boron from the glass, a procedure which is both inefficient and increasingly expensive. Another such procedure disadvantageously involves the use of a prolonged treatment in an ammonia-containing gas stream.

It is known that the annealing point of 96% silica glass is raised if a carbon phase is present in the glass. U.S. Pat. Nos. 3,775,078 to Elmer et al. and 3,813,232 to Forker et al. describe the use of liquid treating media for producing such a carbon phase, while U.S. Pat. No. 3,475,211 to Hasegawa et al. describes a vapor deposition method to provide a similar result.

Products resulting from the above carbon impregnation methods, although quite refractory, are electrically conducting, black in color, non-porous, and opaque. There are many applications for which a transparent, electrically insulating, high-annealing-point glass would be preferred.

It is a principal object of the present invention to provide a convenient process for increasing the annealing point of 96% silica glass without unduly affecting the transparency of the product or producing an electrically conducting glass.

Other objects and advantages of the invention will become apparent from the following description thereof.

SUMMARY OF THE INVENTION

In accordance with the present invention, a transparent 96% silica glass article exhibiting an annealing point in excess of about 1070° C. is produced by a process in which a carbon film is deposited upon the pore walls of a porous 96% silica glass article, the article and film are then heated under non-oxidizing conditions to dehydroxylate the glass, and the carbon film is then essentially completely removed from the glass by oxidation. A permanent increase in annealing point is found to result from the dehydroxylation of the glass which occurs as the glass and carbon film are heated under non-oxidizing conditions at temperatures on the order of about 1,000° C. Thereafter, the carbon film is removed by heating the porous glass and film in a dry oxidizing atmosphere at a temperature above the oxidation temperature of carbon but below the consolidation temperature of the porous glass.

The product of the described process is a porous 96% silica glass article which has a high annealing point but which is essentially transparent. This article may be consolidated to the non-porous state by further heating if a consolidated 96% silica glass article is desired.

The process of the invention is particularly advantageous from the standpoint of manufacturing efficiency because it may conveniently be carried out as a natural incident to a conventional consolidation process. Thus transparent consolidated 96% silica glass of improved refractoriness may be provided without supplemental phase separation and leaching steps such as have been employed for this purpose in the prior art.

DETAILED DESCRIPTION

The initial process step of depositing a carbon film upon the pore walls of a porous 96% silica glass may be accomplished by any suitable means. However, according to a preferred method the carbon is deposited by thermal decomposition of a hydrocarbon gas present in a treating atmosphere which is brought into contact with the porous glass at an elevated temperature. Preferred hydrocarbon gases for use in providing the carbon film include methane and mixtures of hydrocarbons consisting at least predominantly of methane, such as natural gas. However, treating atmospheres containing other hydrocarbon gases could also be used.

In a gas decomposition method such as presently preferred, it is important that the hydrocarbon gas in the treating atmosphere which is brought into contact with the porous glass be limited in concentration in order to avoid clogging of the pore structure of the glass. Pore clogging prevents carbon deposition on pore surfaces within the interior of the glass article, and consequently reduces the effectiveness of the treatment.

The optimum concentration of hydrocarbon gas depends somewhat on the temperature at which contact is carried out, with higher concentrations being permissible where lower deposition temperatures are employed. In the case of hydrocarbon gases consisting at least predominantly of methane, hydrocarbon gas partial pressures in the range of 0.05–0.5 atmospheres at temperatures in the range of 850°–1025° C. may be used. Under these conditions suitable carbon films may be deposited on porous glass within a time interval of about ½–2 hours.

It is normally preferred to carry out carbon film deposition at atmospheric pressure rather than at reduced pressure. Thus the treating atmosphere typically also includes a non-oxidizing carrier gas such as nitrogen, forming gas or the like making up the remainder thereof.

After a carbon film has been deposited upon the pore walls of the porous glass, contact with the hydrocarbon gas may be terminated. However, heating of the glass and film under non-oxidizing conditions should be continued for a time at least sufficient to promote dehydroxylation of the glass. Non-oxidizing conditions may comprise non-oxidizing atmospheres such as nitrogen, argon, or forming gas, or a vacuum. However the use of a non-oxidizing nitrogen atmosphere is preferred.

Suitable temperatures for the non-oxidizing heating step range from about 1000° C. to just below the consolidation temperature of the porous glass. The consolidation temperature of the porous glass is that temperature at which rapid pore closure occurs. If the glass is heated at or above its consolidation temperature during the non-oxidizing heating step, carbon entrapment and a non-transparent product will result. Dehydroxylation at temperatures below 1000° C. is relatively slow, so that the use of such temperatures is not preferred. At temperatures in the range of about 1000°–1100° C., useful dehydroxylation results may be obtained within a time interval of about 0.5–2 hours.

Removal of the carbon film from the pore structure of the glass following the non-oxidizing heating step is rapidly accomplished by heating in an oxidizing atmosphere such as dry air. Although carbon oxidation from porous glass may occur in air at temperatures as low as 450° C., oxidation is more efficient at higher temperatures. The preferred temperature range for oxidation is essentially that range employed in the previous non-oxidizing heating step, e.g., at least about 1000° C. but below the consolidation temperature of the glass. The length of the oxidation step depends on the amount of carbon in the glass, but complete removal can usually be accomplished by heating at 1000°–1100° C. for 0.5–2 hours in air.

In most cases, it is desirable to consolidate the porous glass following treatment as above described. A useful supplemental consolidation step simply comprises heating the carbon-free glass article at a temperature above the porous glass consolidation temperature for a time at least sufficient to consolidate the glass. Equivalently, oxidation and consolidation may be sequentially accomplished by continuous heating of the porous glass in dry air through the carbon oxidation zone and into the porous glass consolidation zone, with heating being carried out at a rate which will insure complete carbon oxidation prior to extensive consolidation of the glass.

The invention may be further understood by reference to the following detailed example.

EXAMPLE

Two sections of porous glass tubing, each section being about 3 inches in length, one inch in outer diameter and having a wall thickness of about 1 millimeter, are selected for treatment. The tubing sections are of identical composition, that composition including about 96% silica by weight with the remainder consisting primarily of alkali metal oxides and $B_2O_3$.

One of the sections of porous glass tubing, designated Sample A, is positioned in an unpressurized tube furnace provided with gas inlet and outlet tubes, heated in the furnace in an air atmosphere to a temperature of 850° C., and then heated from 850° C. to 1000° C. at a heating rate of 100° C. per hour in a flowing atmosphere consisting of 25% natural gas and 75% forming gas by volume. The natural gas component of the atmosphere includes about 96% methane by volume and the forming gas component consists of about 92% nitrogen and 8% hydrogen by volume. The result of this treatment is a black carbon film, deposited on the exterior and interior pore surfaces of the porous glass tubing.

Following the deposition of the carbon film, the flow of natural gas and forming gas is interrupted and flowing nitrogen is introduced into the tube. Sample A is then further heated at a rate of 100° C. per hour from 1000° C. to 1070° C. in the flowing nitrogen atmosphere.

After Sample A has reached a temperature of 1070° C., the flow of nitrogen is interrupted and flowing dry air is substituted therefor. The temperature in the tube furnace is then maintained at 1070° C. for ½ hour, during which the flowing air essentially completely removes the carbon film by oxidation.

Finally, the temperature in the tube furnace is increased from 1070° C. to 1245° C. at a rate of 100° C. per hour and maintained at 1245° C. for ½ hour to achieve complete consolidation of the porous glass, thus providing as the product a section of non-porous 96% silica glass tubing.

Sample A is then removed from the furnace and the other section of tubing, designated Sample B, is positioned therein. Heating of Sample B is then commenced, while maintaining an atmosphere of flowing dry air in the furnace, with Sample B being subjected to a thermal treatment essentially identical to the thermal treatment accorded to Sample A. However, no natural gas, nitrogen, or forming gas is used in the treatment of Sample B; rather the atmosphere of flowing dry air is maintained unchanged throughout the entire heating and consolidation process. The product of this treatment is again a section of non-porous 96% silica glass tubing.

Both of the tubing sections resulting from the described processing are essentially transparent. However, whereas Sample B, which was treated in dry air, has an annealing point of about 1023° C., Sample A, which was treated in natural gas, nitrogen and air, has an annealing point of 1084° C.

Infrared absorption analyses of additional samples of consolidated 96% silica glass tubing treated similarly to Samples A and B above indicate that glass treated in accordance with the process of the invention contains fewer hydroxyl groups than glass treated in dry air. This dehydroxylation apparently accounts for the increase in annealing point which is observed.

Although the suitability of the process of the present invention for incorporation into existing porous glass consolidation heat treatments is readily apparent from the foregoing description, it will also be recognized that the process is useful for producing both porous and non-porous glass, and that many modifications and variations of the particular techniques hereinabove described may be utilized in the production of transparent high-annealing-point glass products within the scope of the appended claims.

I claim:

1. A process for producing a transparent 96% silica glass article having an annealing point in excess of about 1070° C. which comprises the steps of:
   (a) depositing a carbon film upon the pore walls of a porous 96% silica glass article by contacting the porous glass at an elevated temperature with a hydrocarbon gas having a concentration sufficient to deposit said carbon film upon said pore walls but insufficient to clog the pores of said glass article;

(b) heating the glass article and carbon film under non-oxidizing conditions at a temperature below the porous glass consolidation temperature but not less than about 1000° C. for a time at least sufficient to achieve dehydroxylation of the porous glass; and (c) heating the glass article in a dry oxidizing atmosphere at a temperature above the carbon oxidation temperature but below a porous glass consolidation temperature for a time at least sufficient to completely oxidize the carbon film.

2. A process in accordance with claim 1 wherein the hydrocarbon gas consists at least predominantly of methane.

3. A process in accordance with claim 2 wherein the hydrocarbon gas is at a partial pressure of 0.05–0.5 atmospheres and the elevated temperature is in the range of 850°–1025° C.

4. A process in accordance with claim 1 wherein the step of heating under non-oxidizing conditions consists of heating in a nitrogen atmosphere.

5. A process in accordance with claim 4 wherein heating in a nitrogen atmosphere includes a heating interval of 0.5–2 hours at a temperature in the range of 1000°–1100° C.

6. A process in accordance with claim 1 wherein the step of heating the glass article in an oxidizing atmosphere consists of heating the glass article in dry air at a temperature of at least about 1000° C.

7. A process in accordance with claim 6 wherein the step of heating the glass article in dry air includes a heating interval of 0.5–2 hours at a temperature in the range of about 1000°–1100° C.

8. A process in accordance with claim 1 wherein, after the glass article has been heated in a dry oxidizing atmosphere, it is heated at a temperature above the porous glass consolidation temperature for a time at least sufficient to consolidate the glass.

* * * * *